United States Patent
Zhang

(10) Patent No.: US 11,381,343 B2
(45) Date of Patent: Jul. 5, 2022

(54) UPLINK DATA TRANSMISSION CONFIRMATION APPARATUS, DEVICE, AND METHOD

(71) Applicant: Huawei Technologies Co., Ltd., Shenzhen (CN)

(72) Inventor: Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

(21) Appl. No.: 15/186,072

(22) Filed: Jun. 17, 2016

(65) Prior Publication Data

US 2016/0295437 A1 Oct. 6, 2016

Related U.S. Application Data

(63) Continuation of application No. PCT/CN2013/089702, filed on Dec. 17, 2013.

(51) Int. Cl.
*H04L 1/08* (2006.01)
*H04W 72/12* (2009.01)
(Continued)

(52) U.S. Cl.
CPC ............ *H04L 1/08* (2013.01); *H04W 72/042* (2013.01); *H04W 72/1289* (2013.01); *H04W 24/08* (2013.01); *H04W 74/0833* (2013.01)

(58) Field of Classification Search
CPC .................................................... H04L 1/08
See application file for complete search history.

(56) References Cited

U.S. PATENT DOCUMENTS 9,008,050 B2 4/2015 Feuersänger et al.
9,439,222 B2 9/2016 Liang et al.
(Continued)

FOREIGN PATENT DOCUMENTS

CN 101247171 A 8/2008
CN 101515847 A 8/2009
(Continued)

OTHER PUBLICATIONS

ASUSTek, "UL grant misuse after contention resolution", 3GPP TSG-RAN WG2 #65, Athens Greece, Feb. 9-13, 2009, R2-091216 (Year: 2009).*

(Continued)

*Primary Examiner* — Joseph A Bednash
(74) *Attorney, Agent, or Firm* — Slater Matsil, LLP

(57) ABSTRACT

The present disclosure provides an uplink data transmission confirmation apparatus, device, and method. The apparatus includes the following. A transceiver module, configured to send uplink data to a base station; a detection module, configured to detect, within a first preset period, whether first physical downlink control channel signaling sent by the base station is received, and obtain a detection result; and a judging module, configured to determine, according to the detection result, whether the uplink data is successfully transmitted. According to the apparatus provided in embodiments of the present disclosure, physical downlink control channel signaling is reduced in a process of confirming, by the terminal in a coverage enhancement scenario, whether the uplink data is successfully transmitted; and whether an Msg3 is successfully transmitted can be confirmed.

8 Claims, 5 Drawing Sheets

(51) Int. Cl.
*H04W 72/04* (2009.01)
*H04W 24/08* (2009.01)
*H04W 74/08* (2009.01)

(56) References Cited

U.S. PATENT DOCUMENTS

| | | | |
|---|---|---|---|
| 9,774,983 | B2 | 9/2017 | Li et al. |
| 2010/0034162 | A1* | 2/2010 | Ou .................. H04L 1/1887 370/329 |
| 2010/0035581 | A1 | 2/2010 | Jun et al. |
| 2010/0238875 | A1* | 9/2010 | Sung ............. H04W 72/1289 370/329 |
| 2010/0278064 | A1* | 11/2010 | Jeong ............. H04W 74/008 370/252 |
| 2011/0305197 | A1* | 12/2011 | Park .............. H04W 74/002 370/328 |
| 2012/0002555 | A1 | 1/2012 | Ohuchi et al. |
| 2012/0113926 | A1 | 5/2012 | Ou et al. |
| 2012/0250599 | A1 | 10/2012 | Henttonen et al. |
| 2013/0039314 | A1 | 2/2013 | Prateek et al. |
| 2013/0163532 | A1 | 6/2013 | Anderson et al. |
| 2013/0272233 | A1 | 10/2013 | Dinan |
| 2013/0322383 | A1 | 12/2013 | Dinan |
| 2013/0329675 | A1 | 12/2013 | Dinan |
| 2013/0329708 | A1 | 12/2013 | Dinan |
| 2014/0023051 | A1 | 1/2014 | Chen et al. |
| 2014/0105191 | A1* | 4/2014 | Yang .............. H04L 1/1867 370/336 |
| 2015/0334746 | A1* | 11/2015 | Sun .............. H04B 17/309 370/329 |
| 2016/0275124 | A1* | 9/2016 | Lee .............. G06F 17/30256 |
| 2016/0278124 | A1* | 9/2016 | Zhao ............. H04W 56/004 |
| 2016/0286580 | A1* | 9/2016 | Liu .............. H04W 74/0833 |

FOREIGN PATENT DOCUMENTS

| | | |
|---|---|---|
| CN | 101998418 A | 3/2011 |
| CN | 102123457 A | 7/2011 |
| CN | 102158981 A | 8/2011 |
| CN | 102158981 A1 | 8/2011 |
| CN | 102215552 A | 10/2011 |
| CN | 102264052 A | 11/2011 |
| CN | 102740403 A | 10/2012 |
| CN | 102869112 A | 1/2013 |
| CN | 102918896 A | 2/2013 |
| CN | 103220811 A | 7/2013 |
| CN | 103249167 A | 8/2013 |
| CN | 103298121 A | 9/2013 |
| CN | 103313422 A | 9/2013 |
| EP | 2152045 A2 | 2/2010 |
| EP | 2265077 A1 | 12/2010 |
| JP | 2010041729 A | 2/2010 |
| JP | 2012065357 A | 3/2012 |
| JP | 2013528009 A | 7/2013 |
| KR | 20100090632 A | 8/2010 |
| WO | 2011122904 A2 | 10/2011 |
| WO | 2013181444 A2 | 12/2013 |

OTHER PUBLICATIONS

NEC, "MAC Contention resolution for non-initial access", 3GPP TSG-RAN WG2 #59bis, Shanghai, China, Oct. 8-12, 2007, R2-073953 (Year: 2007).*

LG Electroninncs, "Contention Resolution in RRC Connected Mode", 3GPP TSG-RAN 59bis, Shanghai China, Oct. 8-12, 2007, R2-074131 (Year: 2007).*

ZTE, Discussion on Repetition for Control Channel and Traffic Channel, 3GPP TSG RAN WG1 Meeting #74, Barcelona, Spain, Aug. 19-23, 2013 (Year: 2013).*

Catt, "Discussion on Contention Resolution Timer", 3GPP TSG-RAN WG2 #62bis, Warsaw Poland, Jun. 30-Jul. 4, 2008 (Year: 2008).*

ZTE, Discussion on Repetition for Control Channel and Traffic Channel, 3GPP TSG RAN WG1 Meeting #74, Barcelona, Spain, Aug. 19-23, 2013, R1-133062 (Year: 2013).*

Catt, "Discussion on Contention Resolution Timer", 3GPP TSG-RAN WG2 #62bis, Warsaw Poland, Jun. 30- Jul. 4, 2008, R2-083284 (Year: 2008).*

Intel Corporation, "Coverage Enhancement of PRACH for low cost MTC", 3GPP TSG RAN Meeting #75, San Francisco, USA, Nov. 11-15, 2013 (Year: 2013).*

3GPP TS 36.300 V11.1.0 (2102-03), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), pp. 69-71 (Year: 2012).*

3GPP TS 36.211 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11), pp. 15-17 (Year: 2012).*

Intel Corporation, Coverage Enhancement of DL/UL control Channels for low cost MTC, 3GPP TSG RAN WG1 #75, San Francisco, USA, Nov. 11-15, 2013 (Year: 2013).*

ZTE; "Discussion on Repetition for Control Channel and Traffic Channel", 3GPP TSG RAN WG1 Meeting #74, R1-133062, Aug. 19-23, 2013, 9 pages, Barcelona, Spain.

LG Electronics; "RACH procedure for MTC coverage enhancement", 3GPP TSG RAN WG1 #75, R1-135460, Nov. 11-15, 2013, 4 pages, San Francisco, USA.

MCC Support, "Final Report of 3GPP TSG RAN WG1 #74 v1.0.0", (Barcelona, Spain, Aug. 19-23, 2013), 3GPP TSG RAN WG1 Meeting #74bis, R1-134036, Oct. 7-11, 2013, 119 pages, Guangzhou, China.

* cited by examiner

UPLINK DATA TRANSMISSION CONFIRMATION APPARATUS, DEVICE, AND METHOD

CROSS-REFERENCE TO RELATED APPLICATIONS

This application is a continuation of PCT Application No. PCT/CN2013/089702, filed on Dec. 17, 2013, which application is hereby incorporated herein by reference.

TECHNICAL FIELD

The present disclosure relates to communications technologies and, in particular embodiments, to an uplink data transmission confirmation apparatus, device, and method.

BACKGROUND

Currently, a Long Term Evolution (hereinafter briefly referred to as LTE) project of the Third Generation Partnership Project (hereinafter briefly referred to as 3GPP) puts forward a coverage enhancement research topic pertinent to a special application scenario of a terminal, namely, providing coverage enhancement support for a terminal with a relatively large loss, such as a terminal located in a basement, so as to enable the terminal to access a network and obtain a service. Signal repetition is a method for implementing coverage enhancement. Different terminals are located in different environments and require different extents of coverage enhancement. That is, different terminals have different coverage enhancement requirements. Using signal repetition as an example, different terminals also require different quantities of times of signal repetition. After a terminal sends uplink data to a base station, the terminal needs to learn whether the uplink data is transmitted successfully, namely, whether the uplink data is received by the base station correctly. According to an existing protocol, the base station sends a physical hybrid automatic repeat request (ARQ) indicator channel (hereinafter briefly referred to as PHICH) signaling to the terminal, so that the terminal learns a transmission status of the uplink data. In a coverage enhancement scenario, the base station needs to repeatedly send the PHICH signaling, so that the terminal can receive the PHICH signaling correctly, and determine, according to the PHICH signaling, whether the previous uplink data is correctly received by the base station, so as to decide whether the previous uplink data needs to be re-sent to the base station.

In the prior art, to reduce resource consumption caused by repeated sending of the PHICH (where a relatively large quantity of resources are consumed by the repeated sending of the PHICH signaling), a new data indicator (hereinafter briefly referred to as NDI) field in physical downlink control channel (hereinafter briefly referred to as PDCCH) signaling may be used to indicate confirmation of the uplink data. If the NDI field indicates that the PDCCH signaling schedules transmission of new data, it indicates that the previously transmitted data of the terminal is received successfully. Conversely, if the NDI field indicates that the PDCCH signaling schedules transmission of old data, it indicates that the previous data of the terminal is received unsuccessfully, and that the terminal needs to re-send the previous uplink data to the base station.

However, in the prior art, when the uplink data sent by the terminal is confirmed, if the uplink data is last uplink data that is of a non-random access response message (Message3, hereinafter briefly referred to as Msg3) and that is transmitted as scheduled by the PDCCH signaling, and has been received by the base station correctly, the base station still needs to send PDCCH signaling to the terminal, so that the terminal can confirm that the uplink data is successfully received by the base station. In addition, in the coverage enhancement scenario, the PDCCH signaling also needs to be repeatedly transmitted to the terminal, which causes a waste of resources. When the uplink data is an Msg3 that is transmitted without being scheduled by the PDCCH signaling, whether the Msg3 is correctly transmitted cannot be confirmed in the prior art.

SUMMARY

Embodiments of the present disclosure provide an uplink data transmission confirmation apparatus, device, and method, which are used to resolve a technical problem in the prior art that a waste of resources is caused when a terminal confirms whether sent uplink data is successfully transmitted, and that whether an Msg3 message is successfully transmitted cannot be confirmed in the prior art.

A first aspect of the embodiments provides an uplink data transmission confirmation apparatus. The uplink data transmission confirmation apparatus includes a computer having a non-transitory computer-readable medium storing program modules executable by the computer. The program modules include the following. A transceiver module, configured to send uplink data to a base station; a detection module, configured to detect, within a first preset period, whether first physical downlink control channel signaling sent by the base station is received, and obtain a detection result; and a judging module, configured to determine, according to the detection result, whether the uplink data is successfully transmitted.

In an implementation of the first aspect, in response to the uplink data being a non-random access response message Msg3, the first physical downlink control channel signaling is used to instruct the transceiver module to re-send the uplink data.

In an implementation of the first aspect, the judging module is configured to determine that the uplink data is successfully transmitted, in response to the detection module detecting, within the first preset period, no first physical downlink control channel signaling sent by the base station. In an implementation of the first aspect, the judging module is configured to determine that the uplink data is unsuccessfully transmitted, in response to the detection module detecting, within the first preset period, the first physical downlink control channel signaling sent by the base station.

In an implementation of the first aspect, in response to the uplink data being an Msg3, the first physical downlink control channel signaling is used to instruct the transceiver module to receive a random access contention resolution message Msg4 sent by the base station.

In an implementation of the first aspect, the judging module is further configured to determine that the uplink data is successfully transmitted, in response to the detection module detecting, within the first preset period, the first physical downlink control channel signaling sent by the base station. In an implementation of the first aspect, the judging module is further configured to determine that the uplink data is unsuccessfully transmitted, in response to the detection module detecting, within the first preset period, no first physical downlink control channel signaling sent by the base station.

In an implementation of the first aspect, the transceiver module is further configured to receive a second physical downlink control channel signaling sent by the base station, before sending the uplink data. In this implementation of the first aspect, the second physical downlink control channel signaling is used to instruct the transceiver module to send the uplink data.

In an implementation of the first aspect, the first preset period is configured by the apparatus. In an implementation of the first aspect, the first preset period is determined by the apparatus according to a rule predefined by the apparatus and the base station.

In an implementation of the first aspect, the first preset period is configured by the base station according to a coverage enhancement requirement level of the apparatus. In an implementation of the first aspect, the first preset period is determined by the apparatus according to a mapping relationship between a coverage enhancement requirement level predefined by the apparatus and the base station and the first preset period.

A second aspect of the embodiments provides an uplink data transmission confirmation apparatus. The uplink data transmission confirmation apparatus includes a computer having a non-transitory computer-readable medium storing program modules executable by the computer. The program modules include the following. A detection and receiving module, configured to detect, within a second preset period, whether uplink data sent by a terminal is received, and obtain a detection result; and a determining module, configured to determine, according to the detection result, whether to send first physical downlink control channel signaling to the terminal.

In an implementation of the second aspect, in response to the uplink data being a non-random access response message Msg3, the first physical downlink control channel signaling is used to instruct the terminal to re-send the uplink data.

In an implementation of the second aspect, the program modules further include a first sending module, where the determining module is configured to instruct the first sending module not to send the first physical downlink control channel signaling to the terminal, in response to the detection and receiving module receiving, within the second preset period, the uplink data sent by the terminal, so that the terminal determines that the uplink data is successfully transmitted. In an implementation of the second aspect, the determining module is configured to instruct the first sending module to send the first physical downlink control channel signaling to the terminal, in response to the detection and receiving module receiving, within the second preset period, no uplink data sent by the terminal, so that the terminal determines that the uplink data is unsuccessfully transmitted.

In an implementation of the second aspect, in response to the uplink data being an Msg3, the first physical downlink control channel signaling is used to instruct the terminal to receive a random access contention resolution message Msg4.

In an implementation of the second aspect, the program modules further include a second sending module, where the determining module is further configured to instruct the second sending module to send the first physical downlink control channel signaling to the terminal, in response to the detection and receiving module receiving, within the second preset period, the uplink data sent by the terminal, so that the terminal determines that the uplink data is successfully transmitted. In an implementation of the second aspect, the determining module is further configured to instruct the second sending module not to send the first physical downlink control channel signaling to the terminal, in response to the detection and receiving module receiving, within the second preset period, no uplink data sent by the terminal, so that the terminal determines that the uplink data is unsuccessfully transmitted.

In an implementation of the second aspect, the first sending module is further configured to send second physical downlink control channel signaling to the terminal, before the detection and receiving module detects, within the second preset period, whether the uplink data sent by the terminal is received. In this implementation of the second aspect, the second physical downlink control channel signaling is used to instruct the terminal to send the uplink data.

In an implementation of the second aspect, the second preset period is configured by the apparatus. In an implementation of the second aspect, the second preset period is configured by the apparatus according to a rule predefined by the apparatus and the terminal.

In an implementation of the second aspect, the second preset period is configured by the apparatus according to a coverage enhancement requirement level of the terminal. In an implementation of the second aspect, the second preset period is determined by the apparatus according to a mapping relationship between a coverage enhancement requirement level predefined by the apparatus and the terminal and the second preset period.

A third aspect of the embodiments provides an uplink data transmission confirmation device, including the following. A transceiver, configured to send uplink data to a base station; and a processor, configured to detect, within a first preset period, whether first physical downlink control channel signaling sent by the base station is received, and obtain a detection result. The processor is further configured to determine, according to the detection result, whether the uplink data is successfully transmitted.

In an implementation of the third aspect, in response to the uplink data being a non-random access response message Msg3, the first physical downlink control channel signaling is used to instruct the transceiver to re-send the uplink data.

In an implementation of the third aspect, the processor is configured to determine that the uplink data is successfully transmitted, in response to the detection result being that no first physical downlink control channel signaling sent by the base station is detected within the first preset period. In an implementation of the third aspect, the processor is configured to determine that the uplink data is unsuccessfully transmitted, in response to the detection result being that the first physical downlink control channel signaling sent by the base station is detected within the first preset period.

In an implementation of the third aspect, in response to the uplink data being an Msg3, the first physical downlink control channel signaling is used to instruct the transceiver to receive a random access contention resolution message Msg4 sent by the base station.

In an implementation of the third aspect, the processor is further configured to determine that the uplink data is successfully transmitted, in response to the detection result being that the first physical downlink control channel signaling sent by the base station is detected within the first preset period. In an implementation of the third aspect, the processor is further configured to determine that the uplink data is unsuccessfully transmitted, in response to the detection result being that no first physical downlink control channel signaling sent by the base station is detected within the first preset period.

In an implementation of the third aspect, the transceiver is further configured to receive a second physical downlink control channel signaling sent by the base station, before the transmitter sends the uplink data. In this implementation, the second physical downlink control channel signaling is used to instruct the transceiver to send the uplink data.

In an implementation of the third aspect, the first preset period is configured by the device. In an implementation of the third aspect, the first preset period is determined by the device according to a rule predefined by the device and the base station.

In an implementation of the third aspect, the first preset period is configured by the base station according to a coverage enhancement requirement level of the device. In an implementation of the third aspect, the first preset period is determined by the device according to a mapping relationship between a coverage enhancement requirement level predefined by the device and the base station and the first preset period.

A fourth aspect of the embodiments provides an uplink data transmission confirmation device, including the following. A processor, configured to detect, within a second preset period, whether uplink data sent by a terminal is received, and obtain a detection result. The processor is further configured to determine, according to the detection result, whether to send first physical downlink control channel signaling to the terminal.

In an implementation of the fourth aspect, in response to the uplink data being a non-random access response message Msg3, the first physical downlink control channel signaling is used to instruct the terminal to re-send the uplink data.

In an implementation of the fourth aspect, the device further includes a transmitter, where the processor is configured to instruct the transmitter not to send the first physical downlink control channel signaling to the terminal, in response to the detection result being that the uplink data sent by the terminal is received within the second preset period, so that the terminal determines that the uplink data is successfully transmitted. In an implementation of the fourth aspect, the processor is further configured to instruct the transmitter to send the first physical downlink control channel signaling to the terminal, in response to the detection result being that no uplink data sent by the terminal is received within the second preset period, so that the terminal determines that the uplink data is unsuccessfully transmitted.

In an implementation of the fourth aspect, in response to the uplink data being an Msg3, the first physical downlink control channel signaling is used to instruct the terminal to receive a random access contention resolution message Msg4 sent by a base station.

In an implementation of the fourth aspect, the apparatus further includes a transmitter, where the processor is further configured to instruct the transmitter to send the first physical downlink control channel signaling to the terminal, in response to the detection result being that the uplink data sent by the terminal is received within the second preset period, so that the terminal determines that the uplink data is successfully transmitted. In an implementation of the fourth aspect, the processor is further configured to instruct the transmitter not to send the first physical downlink control channel signaling to the terminal, in response to the detection result being that no uplink data sent by the terminal is received within the second preset period, so that the terminal determines that the uplink data is unsuccessfully transmitted.

In an implementation of the fourth aspect, the transmitter is further configured to send second physical downlink control channel signaling to the terminal, before the processor detects, within the second preset period, whether the uplink data sent by the terminal is received. In this implementation, the second physical downlink control channel signaling is used to instruct the terminal to send the uplink data.

In an implementation of the fourth aspect, the second preset period is configured by the device. In an implementation of the fourth aspect, the second preset period is configured by the device according to a rule predefined by the device and the terminal.

In an implementation of the fourth aspect, the second preset period is configured by the device according to a coverage enhancement requirement level of the terminal. In an implementation of the fourth aspect, the second preset period is determined by the device according to a mapping relationship between a coverage enhancement requirement level predefined by the device and the terminal and the second preset period.

A fifth aspect of the embodiments provides an uplink data transmission confirmation method, including the following. Sending, by a terminal, uplink data to a base station; detecting, by the terminal within a first preset period, whether first physical downlink control channel signaling sent by the base station is received, and obtaining a detection result; and determining, by the terminal according to the detection result, whether the uplink data is successfully transmitted.

In an implementation of the fifth aspect, in response to the uplink data being a non-random access response message Msg3, the first physical downlink control channel signaling is used to instruct the terminal to re-send the uplink data.

In an implementation of the fifth aspect, the determining, by the terminal according to the detection result, whether the uplink data is successfully transmitted includes determining, by the terminal, that the uplink data is successfully transmitted, in response to the terminal detecting, within the first preset period, no first physical downlink control channel signaling sent by the base station. In an implementation of the fifth aspect, the determining, by the terminal according to the detection result, whether the uplink data is successfully transmitted includes determining, by the terminal, that the uplink data is unsuccessfully transmitted, in response to the terminal detecting, within the first preset period, the first physical downlink control channel signaling sent by the base station.

In an implementation of the fifth aspect, in response to the uplink data being an Msg3, the first physical downlink control channel signaling is used to instruct the terminal to receive a random access contention resolution message Msg4 sent by the base station.

In an implementation of the fifth aspect, the determining, by the terminal according to the detection result, whether the uplink data is successfully transmitted includes determining, by the terminal, that the uplink data is successfully transmitted, in response to the terminal detecting, within the first preset period, the first physical downlink control channel signaling sent by the base station. In an implementation of the fifth aspect, the determining, by the terminal according to the detection result, whether the uplink data is successfully transmitted includes determining, by the terminal, that the uplink data is unsuccessfully transmitted, in response to the terminal detecting, within the first preset period, no first physical downlink control channel signaling sent by the base station.

In an implementation of the fifth aspect, before the sending, by a terminal, uplink data to a base station, the method further includes the following. Receiving, by the terminal, second physical downlink control channel signaling sent by the base station, where the second physical downlink control channel signaling is used to instruct the terminal to send the uplink data.

In an implementation of the fifth aspect, the first preset period is configured by the base station. In an implementation of the fifth aspect, the first preset period is determined by the terminal according to a rule predefined by the terminal and the base station.

In an implementation of the fifth aspect, the first preset period is configured by the base station according to a coverage enhancement requirement level of the terminal. In an implementation of the fifth aspect, the first preset period is determined by the terminal according to a mapping relationship between a coverage enhancement requirement level predefined by the terminal and the base station and the first preset period.

A sixth aspect of the embodiments provides an uplink data transmission confirmation method, including the following. Detecting, by a base station within a second preset period, whether uplink data sent by a terminal is received, and obtaining a detection result; and determining, by the base station according to the detection result, whether to send first physical downlink control channel signaling to the terminal.

In an implementation of the sixth aspect, in response to the uplink data being a non-random access response message Msg3, the first physical downlink control channel signaling is used to instruct the terminal to re-send the uplink data.

In an implementation of the sixth aspect, the determining, by the base station according to the detection result, whether to send first physical downlink control channel signaling to the terminal includes sending, by the base station, no first physical downlink control channel signaling to the terminal, in response to the base station receiving, within the second preset period, the uplink data sent by the terminal, so that the terminal determines that the uplink data is successfully transmitted. In an implementation of the sixth aspect, the determining, by the base station according to the detection result, whether to send first physical downlink control channel signaling to the terminal includes sending, by the base station, the first physical downlink control channel signaling to the terminal, in response to the base station receiving, within the second preset period, no uplink data sent by the terminal, so that the terminal determines that the uplink data is unsuccessfully transmitted.

In an implementation of the sixth aspect, in response to the uplink data being an Msg3, the first physical downlink control channel signaling is used to instruct the terminal to receive a random access contention resolution message Msg4 sent by the base station.

In an implementation of the sixth aspect, the determining, by the base station according to the detection result, whether to send first physical downlink control channel signaling to the terminal includes sending, by the base station, the first physical downlink control channel signaling to the terminal, in response to the base station receiving, within the second preset period, the uplink data sent by the terminal, so that the terminal determines that the uplink data is successfully transmitted. In an implementation of the sixth aspect, the determining, by the base station according to the detection result, whether to send first physical downlink control channel signaling to the terminal includes sending, by the base station, no first physical downlink control channel signaling to the terminal, in response to the base station receiving, within the second preset period, no uplink data sent by the terminal, sending, by the base station, so that the terminal determines that the uplink data is unsuccessfully transmitted.

In an implementation of the sixth aspect, before the detecting, by a base station within a second preset period, whether uplink data sent by a terminal is received, the method further includes the following. Sending, by the base station, second physical downlink control channel signaling to the terminal, where the second physical downlink control channel signaling is used to instruct the terminal to send the uplink data.

In an implementation of the sixth aspect, the second preset period is configured by the base station. In an implementation of the sixth aspect, the second preset period is configured by the base station according to a rule predefined by the base station and the terminal.

In an implementation of the sixth aspect, the second preset period is configured by the base station according to a coverage enhancement requirement level of the terminal. In an implementation of the sixth aspect, the second preset period is determined by the base station according to a mapping relationship between a coverage enhancement requirement level predefined by the base station and the terminal and the second preset period.

According to the uplink data transmission confirmation apparatus, device, and method provided in the embodiments of the present disclosure, after a transceiver module sends uplink data to a base station, a detection module detects whether first physical downlink control channel signaling sent by the base station is received, and obtains a detection result. In addition, a judging module determines, according to the detection result of the detection module, whether the uplink data is successfully transmitted. According to the embodiments of the present disclosure, the detection module determines, within a preset first period, whether the first physical downlink control channel signaling is received. The judging module determines, according to the detection result, whether the uplink data is successfully transmitted, so that when the uplink data is successfully received, the base station does not need to specially send physical downlink control channel signaling to enable the confirmation apparatus to confirm whether the uplink data is successfully transmitted. Therefore, overheads of the physical downlink control channel signaling are reduced, and the confirmation apparatus can confirm, by using the first physical downlink control channel signaling, whether an Msg3 is successfully transmitted.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present disclosure clearer, the following describes the technical solutions in the embodiments of the present disclosure with reference to the accompanying drawings. The described embodiments are some but not all of the embodiments of the present disclosure. All other embodiments obtained by persons of ordinary skill in the art based on the embodiments of the present disclosure without creative efforts shall fall within the protection scope of the present disclosure.

A terminal involved in this application, that is, user equipment, may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks by using a radio access network (such as RAN). The wireless terminal may be a mobile terminal, such as a mobile phone (also referred to as a "cellular" phone), and a computer and a machine type communication (hereinafter briefly referred to as MTC) device with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment.

A base station (for example, an access point) involved in this application may refer to a device in communication with a wireless terminal by using one or more sectors at an air interface in an access network. The base station may be configured to perform conversion between a received over-the-air frame and an Internet Protocol (IP) packet, and serves as a router between the wireless terminal and a rest portion of the access network, where the rest portion of the access network may include an IP network. The base station may also coordinate attribute management of the air interface. For example, the base station may be a base transceiver station (BTS) in GSM or CDMA, may be a NodeB in WCDMA, or may be an evolved NodeB (eNB or e-NodeB) in LTE, which is not limited in this application.

The embodiments relate to a scenario of a process of confirming, by a terminal in a coverage enhancement scenario without PHICH channel enhancement, whether uplink data sent by the terminal is successfully transmitted.

Figure 1:
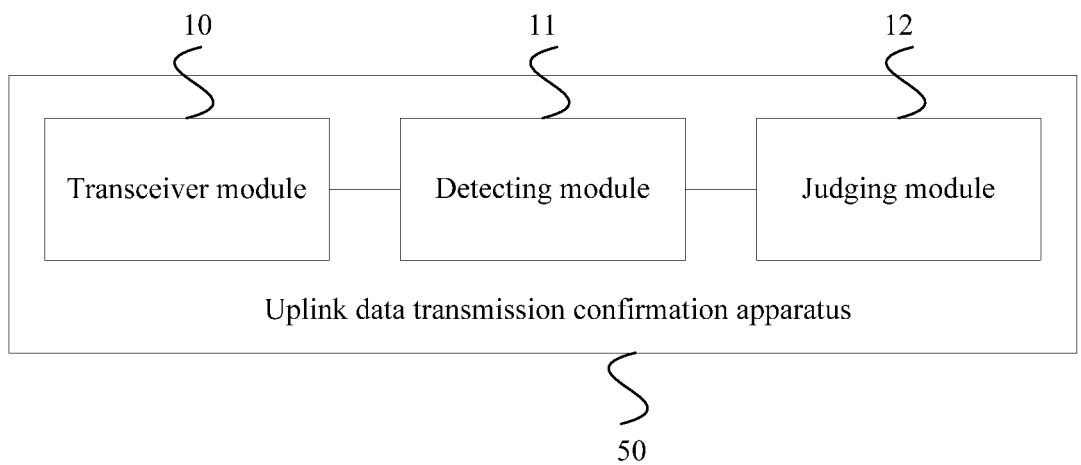
FIG. 1 is a schematic structural diagram of an embodiment of an uplink data transmission confirmation apparatus.

FIG. 1 is a schematic structural diagram of an embodiment of an uplink data transmission confirmation apparatus. The apparatus may be a terminal or may be integrated in a terminal. As shown in FIG. 1, the confirmation apparatus 50 includes the following. A transceiver module 10, configured to send uplink data to a base station; a detection module 11, configured to detect, within a first preset period, whether first physical downlink control channel signaling sent by the base station is received, and obtain a detection result; and a judging module 12, configured to determine, according to the detection result, whether the uplink data is successfully transmitted.

Specifically, the transceiver module 10 learns, according to scheduling by the base station, uplink resources allocated by the base station for sending the uplink data, and the transceiver module 10 sends the uplink data to the base station on these uplink resources, where the uplink data may be a non-Msg3 or may be an Msg3. In addition, when the uplink data sent by the transceiver module 10 is a non-Msg3, the base station needs to perform scheduling by using PDCCH signaling. When the uplink data sent by the transceiver module 10 is an Msg3, the base station does not need to perform scheduling by using PDCCH signaling, and instead, performs scheduling by using a random access response (Random Access Response, hereinafter briefly referred to as RAR) message. Then, the uplink data transmission confirmation apparatus 50 starts a first timer. The first timer corresponds to the first preset period. Optionally, a length of the first preset period may be configured by the base station, or may be determined according to a rule predefined by the confirmation apparatus 50 and the base station. The length of the first preset period is related to a coverage enhancement requirement of the terminal.

The detection module 11 detects, within the first preset period, whether the first physical downlink control channel signaling sent by the base station within a second preset period is received, and obtains a detection result. The first physical downlink control channel signaling may be PDCCH signaling or may be ePDCCH (enhanced PDCCH) signaling, which is not limited in this embodiment. The second preset period may be the following. For a non-Msg3, the base station starts a second timer after scheduling the confirmation apparatus 50 to send the uplink data. For an Msg3, the base station starts a second timer after sending an RAR message to the confirmation apparatus 50. A corresponding second preset period is set for the second timers mentioned herein. Regardless of whether the uplink data is a non-Msg3 or an Msg3, the second preset period is set in order that as long as the base station sends the first physical downlink control channel signaling. It needs to be ensured that the confirmation apparatus 50 can correctly receive the first physical downlink control channel signaling before the first preset period expires. Optionally, the second preset period may also be configured by the base station, or may be configured by the base station according to a rule predefined by the base station and the confirmation apparatus 50. Optionally, the second preset period is configured by the base station according to a coverage enhancement requirement level of the confirmation apparatus 50, or is determined by the base station according to a mapping relationship between a coverage enhancement requirement level predefined by the base station and the confirmation apparatus 50 and the second preset period. It should be noted that the coverage enhancement requirement level of the confirmation apparatus 50 may be a coverage enhancement requirement of the terminal or may be a coverage enhancement requirement of a message sent between the terminal and the base station. For example, in response to coverage enhancement requirements of terminals being different or in response to coverage enhancement requirements of messages sent between terminals and the base station are different, quantities of required times of signal repetition are different to satisfy the enhancement requirements, and therefore, a difference may exist in the following. A time taken by the terminal to wait for the first physical downlink control channel signaling after sending the uplink data; a time taken by the base station to wait, after scheduling the terminal to send the uplink data, for receiving the uplink data sent by the terminal; or a time taken for the first physical downlink control channel signaling to arrive at the terminal after the base station sends the first physical downlink control channel signaling. Therefore, the first preset period or the second preset period is related to the coverage enhancement requirement.

Finally, the judging module 12 may determine, according to the detection result obtained by the detection module 11, whether the uplink data is successfully transmitted.

According to the uplink data transmission confirmation apparatus provided in this embodiment, after a transceiver module sends uplink data to a base station, a detection module detects whether first physical downlink control channel signaling sent by the base station is received, and obtains a detection result. A judging module determines, according to the detection result of the detection module, whether the uplink data is successfully transmitted. According to this embodiment, the detection module determines, within a preset first period, whether the first physical downlink control channel signaling is received. The judging module then determines, according to the detection result, whether the uplink data is successfully transmitted, so that when the uplink data is successfully received, the base station does not need to specially send physical downlink control channel signaling to enable the confirmation apparatus to confirm whether the uplink data is successfully transmitted. Therefore, overheads of the physical downlink control channel signaling are reduced, and the confirmation apparatus can confirm, by using the first physical downlink control channel signaling, whether an Msg3 is successfully transmitted.

In the embodiment shown in FIG. 1, the transceiver module 10 is further configured to receive second physical downlink control channel signaling sent by the base station, before sending the uplink data. In this embodiment, the second physical downlink control channel signaling is used to instruct the transceiver module 10 to send the uplink data.

Specifically, when the transceiver module 10 sends the uplink data to the base station, the uplink data generally needs to be sent on an uplink resource allocated by the base station. Therefore, the base station uses the second physical downlink control channel signaling to notify the confirmation apparatus 50 of resources on which the uplink data should be sent, so that the base station can receive, on such resources, the uplink data sent by the transceiver module 10.

The embodiment shown in FIG. 1 relates to a process of confirming, by the confirmation apparatus 50 when the uplink data is a non-Msg3, whether the uplink data is successfully transmitted. Further, the first physical downlink control channel signaling is used to instruct the transceiver module 10 to re-send the uplink data. The judging module 12 is configured to determine that the uplink data is successfully transmitted, in response to the detection result being that the detection module 11 detects, within the first preset period, no first physical downlink control channel signaling sent by the base station. In some embodiments, the judging module 12 is configured to determine that the uplink data is unsuccessfully transmitted, in response to the detection result being that the detection module 11 detects, within the first preset period, the first physical downlink control channel signaling sent by the base station.

Specifically, when the uplink data sent by the transceiver module 10 to the base station is successfully transmitted, in the prior art, the base station sends PDCCH signaling to notify the confirmation apparatus 50 that the base station successfully receives the uplink data. However, in this embodiment, the base station does not need to specially send PDCCH signaling to the confirmation apparatus 50. Instead, the detection module 11 in the confirmation apparatus 50 detects, within the first preset period, whether the first physical downlink control channel signaling is received. In this embodiment, the first physical downlink control channel signaling is used to instruct the transceiver module 10 to re-send the previously sent uplink data. In response to the detection result being that the first physical downlink control channel signaling is detected, the judging module 12 determines that the base station does not successfully receive the uplink data, that is, confirms that the uplink data is unsuccessfully transmitted. The transceiver module 10 re-sends the previously sent uplink data to the base station according to the first physical downlink control channel signaling. In response to the detection result being that no first physical downlink control channel signaling is detected, the judging module 12 determines that the base station has successfully received the uplink data. Therefore, when the uplink data is successfully received, the base station does not need to specially send PDCCH signaling or ePDCCH signaling to the confirmation apparatus 50 to notify that the base station successfully receives the uplink data. Consequently, overheads of the physical downlink control channel signaling are reduced.

According to the uplink data transmission confirmation apparatus provided in this embodiment, after a transceiver module receives second physical downlink control channel signaling that is used to instruct the transceiver module to send uplink data to a base station and that is sent by the base station, the transceiver module sends uplink data that is a non-Msg3 to the base station. A detection module detects whether first physical downlink control channel signaling sent by the base station is received, and obtains a detection result. A judging module determines, according to the detection result of the detection module, whether the uplink data is successfully transmitted. According to this embodiment, when the uplink data is successfully received, the base station does not need to specially send physical downlink control channel signaling to enable the confirmation apparatus to confirm whether the uplink data is successfully transmitted. As a result, overheads of the physical downlink control channel signaling are reduced.

Another implementation of the embodiment shown in FIG. 1 relates to a process of confirming, by the confirmation apparatus 50, when the uplink data is an Msg3, whether the uplink data is successfully transmitted. Further, the first physical downlink control channel signaling is used to instruct the transceiver module 10 to receive a random access contention resolution message (Message4, hereinafter briefly referred to as Msg4) sent by the base station. The judging module 12 is further configured to determine that the uplink data is successfully transmitted, in response to the detection result being that the detection module 11 detects, within the first preset period, the first physical downlink control channel signaling sent by the base station. In this embodiment, the judging module 12 may be configured to determine that the uplink data is unsuccessfully transmitted, in response to the detection result being that the detection module 11 detects, within the first preset period, no first physical downlink control channel signaling sent by the base station.

Specifically, in a random access response process, the confirmation apparatus 50 may randomly access the base station. That is, when the transceiver module 10 sends the uplink data, the base station does not need to perform scheduling by using PDCCH signaling, and instead, performs scheduling by using an RAR message.

When the uplink data is an Msg3, whether the uplink data is correctly transmitted cannot be confirmed in the prior art. However, in this embodiment, when the uplink data sent by the transceiver module 10 is successfully transmitted, the base station sends the first physical downlink control channel signaling to the confirmation apparatus 50. In this embodiment, the first physical downlink control channel signaling is used to instruct the transceiver module 10 to receive, on a corresponding resource, the Msg4 sent by the base station. That is, the detection module 11 in the confirmation apparatus 50 detects, within the first preset period, whether the first physical downlink control channel signaling is received. In response to the first physical downlink control channel signaling being detected, the judging module 12 determines that the base station successfully receives the uplink data, and in this case, the transceiver module 10 receives, according to the first physical downlink control channel signaling, the Msg4 sent by the base station.

When the uplink data sent by the transceiver module 10 is unsuccessfully transmitted, the detection module 11 detects, within the first preset period, whether the first physical downlink control channel signaling is received. In response to no first physical downlink control channel signaling being detected within the first preset period, the judging module 12 determines that the base station does not successfully receive the uplink data.

Further, the first preset period is configured by the base station according to a coverage enhancement requirement level of the confirmation apparatus 50. In some embodiments, the first preset period is determined by the confirmation apparatus 50 according to a mapping relationship between a coverage enhancement requirement level predefined by the confirmation apparatus 50 and the base station and the first preset period.

According to the uplink data transmission confirmation apparatus provided in this embodiment, a transceiver module sends an Msg3 to a base station. A detection module detects whether first physical downlink control channel signaling sent by the base station is received, and obtains a detection result. A judging module determines, according to the detection result of the detection module, whether uplink data is successfully transmitted. This embodiment enables the base station to confirm, by using the first physical downlink control channel signaling and when the uplink data is received successfully or unsuccessfully, whether the Msg3 is successfully transmitted.

Figure 2:
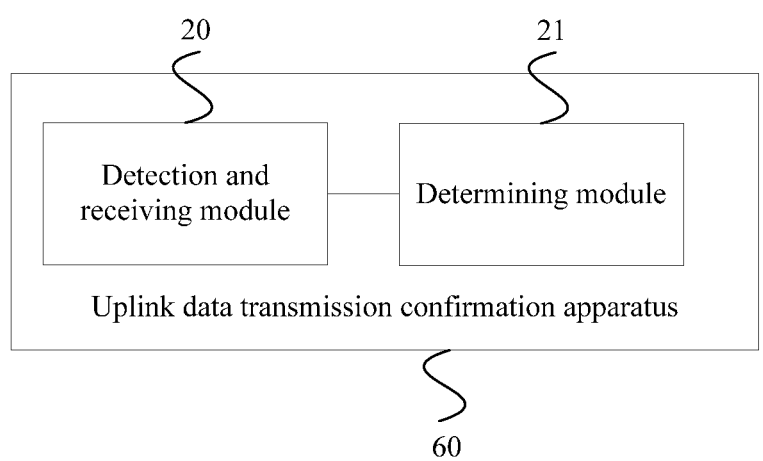
FIG. 2 is a schematic structural diagram of another embodiment of an uplink data transmission confirmation apparatus.

FIG. 2 is a schematic structural diagram of another embodiment of an uplink data transmission confirmation apparatus. The confirmation apparatus 60 may be a base station or may be integrated in a base station. As shown in FIG. 2, the confirmation apparatus 60 includes the following. A detection and receiving module 20, configured to detect, within a second preset period, whether uplink data sent by a terminal is received, and obtain a detection result; and a determining module 21, configured to determine, according to the detection result, whether to send first physical downlink control channel signaling to the terminal.

Specifically, the terminal sends the uplink data to the confirmation apparatus 60, where the uplink data may be a non-Msg3 or may be an Msg3. In addition, when the uplink data sent by the terminal is a non-Msg3, the confirmation apparatus 60 needs to perform scheduling by using PDCCH signaling. When the uplink data sent by the terminal is an Msg3, the confirmation apparatus 60 does not need to perform scheduling by using PDCCH signaling, and instead, performs scheduling by using an RAR message. Moreover, after the terminal sends the uplink data to the confirmation apparatus 60, a first timer is started. The first timer corresponds to a first preset period. Optionally, a length of the first preset period may be configured by the confirmation apparatus 60, or may be determined according to a rule predefined by the terminal and the confirmation apparatus 60. The length of the first preset period is related to a coverage enhancement requirement of the terminal. Optionally, the first preset period is configured by the confirmation apparatus 60 according to a coverage enhancement requirement level of the terminal, or is determined by the confirmation apparatus 60 according to a mapping relationship between a coverage enhancement requirement level predefined by the confirmation apparatus 60 and the terminal and the first preset period. It should be noted that the coverage enhancement requirement level of the confirmation apparatus 60 may be a coverage enhancement requirement of the terminal or may be a coverage enhancement requirement of a message sent between the terminal and the base station.

When the uplink data sent by the terminal is a non-Msg3, the confirmation apparatus 60 schedules the terminal, that is, notifies the terminal of resources on which the uplink data should be sent to the confirmation apparatus 60, and then starts a second timer in the confirmation apparatus 60. The second timer corresponds to the second preset period. When the uplink data sent by the terminal is an Msg3, the confirmation apparatus 60 starts a second timer after sending an RAR message to the terminal. Similarly, the second timer corresponds to the second preset period.

The detection and receiving module 20 detects, within the second preset period, whether the uplink data sent by the terminal is received, and obtain a detection result. The determining module 21 in the confirmation apparatus 60 decides, according to the detection result, whether to send the first physical downlink control channel signaling to the terminal. For example, the confirmation apparatus 60 does not specially send physical downlink control channel signaling to the terminal to notify the terminal that the confirmation apparatus 60 successfully receives the uplink data, in response to the detection result being that the confirmation apparatus 60 successfully receives the non-Msg3. Instead, the terminal itself determines whether the corresponding physical downlink control channel signaling is received within the first preset period, so as to determine whether the uplink data is successfully transmitted. In response to the detection result being that the confirmation apparatus 60 does not successfully receive the Msg3, the terminal determines whether the corresponding physical downlink control channel signaling is received within the first preset period, so as to determine whether the uplink data is successfully transmitted. Therefore, the confirmation apparatus 60 reduces the corresponding physical downlink control channel signaling, and can confirm whether the Msg3 is successfully transmitted.

It should be noted that regardless of whether the uplink data is a non-Msg3 or an Msg3, the second preset period is set in order that as long as the base station sends the first physical downlink control channel signaling, it needs to be ensured that the terminal can correctly receive the first physical downlink control channel signaling before the first preset period expires. Optionally, the second preset period may be configured by the confirmation apparatus 60, or may be configured by the confirmation apparatus 60 according to a rule predefined by the confirmation apparatus 60 and the terminal.

According to the uplink data transmission confirmation apparatus provided in this embodiment, a detection and receiving module of the confirmation apparatus detects whether uplink data sent by a terminal is received, and obtains a detection result. A determining module determines, according to the detection result, whether to send first physical downlink control channel signaling to the terminal, so that when the uplink data is successfully received, the confirmation apparatus does not need to specially send physical downlink control channel signaling to enable the terminal to confirm whether the uplink data is successfully transmitted. Therefore, overheads of the physical downlink control channel signaling are reduced, and the terminal can confirm, by using the first physical downlink control channel signaling, whether an Msg3 is successfully transmitted.

Figure 3:
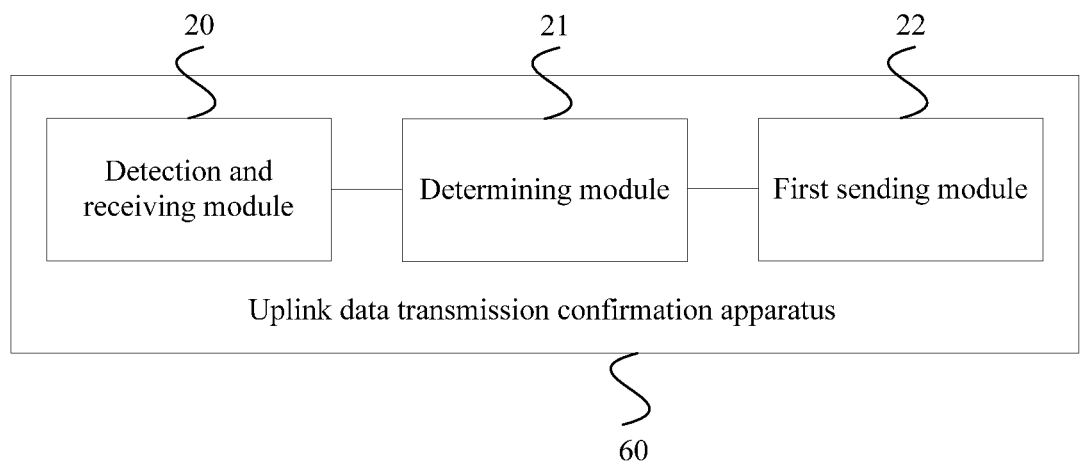
FIG. 3 is a schematic structural diagram of yet another embodiment of an uplink data transmission confirmation apparatus.

FIG. 3 is a schematic structural diagram of yet another embodiment of an uplink data transmission confirmation apparatus. In the embodiment shown in FIG. 3, the confirmation apparatus 60 further includes a first sending module 22, which is configured to send second physical downlink control channel signaling to the terminal, before the detection and receiving module 20 detects, within the second preset period, whether the uplink data sent by the terminal is received. In this embodiment, the second physical downlink control channel signaling is used to instruct the terminal to send the uplink data.

Specifically, when the terminal sends the uplink data, the uplink data needs to be sent on a corresponding resource. Therefore, the confirmation apparatus 60 needs to allocate corresponding resources to the terminal and notify the terminal to send the uplink data on such resources. That is, the first sending module 22 in the confirmation apparatus 60 sends the second physical downlink control channel signaling to the terminal, where the second physical downlink control channel signaling is used to instruct the terminal to send the uplink data.

An implementation of the embodiment shown in FIG. 3 relates to a process of confirming, by the terminal together with the confirmation apparatus 60, when the uplink data is a non-Msg3, whether the uplink data is successfully transmitted. Further, the first physical downlink control channel signaling is used to instruct the terminal to re-send the uplink data. The determining module 21 is configured to instruct the first sending module 22 not to send the first physical downlink control channel signaling to the terminal, in response to the detection result being that the detection and receiving module 20 receives, within the second preset period, the uplink data sent by the terminal, so that the terminal determines that the uplink data is successfully transmitted. In some embodiments, the determining module 21 is configured to instruct the first sending module 22 to send the first physical downlink control channel signaling to the terminal, in response to the detection result being that the detection and receiving module 20 receives, within the second preset period, no uplink data sent by the terminal, so that the terminal determines that the uplink data is unsuccessfully transmitted.

Specifically, when the confirmation apparatus 60 does not successfully receive the uplink data sent by the terminal, the first physical downlink control channel signaling (that is used to instruct the terminal to re-send the uplink data) is sent to the terminal in this embodiment. However, when the confirmation apparatus 60 successfully receives the uplink data sent by the terminal, in the prior art, the confirmation apparatus 60 sends PDCCH signaling to notify the terminal that the confirmation apparatus 60 successfully receives the uplink data, and in a coverage enhancement scenario, further repeatedly sends the PDCCH signaling. However, in this embodiment, the confirmation apparatus 60 does not need to specially send PDCCH signaling to the terminal. Instead, the terminal detects, within the first preset period, whether the first physical downlink control channel signaling is received. In this embodiment, the first physical downlink control channel signaling is used to instruct the terminal to re-send the previously sent uplink data. In response to the terminal detecting the first physical downlink control channel signaling within the first preset period, the terminal determines that the confirmation apparatus 60 does not successfully receive the uplink data, that is, confirms that the uplink data is unsuccessfully transmitted. The terminal re-sends the previously sent uplink data to the confirmation apparatus 60 according to the first physical downlink control channel signaling. In response to the terminal detecting no first physical downlink control channel signaling, the terminal determines that the confirmation apparatus 60 has successfully received the uplink data, and in this case, the first sending module 22 in the confirmation apparatus 60 does not need to specially send PDCCH signaling or ePDCCH signaling to the terminal to notify that the base station successfully receives the uplink data. As a result, overheads of the physical downlink control channel signaling are reduced.

According to the uplink data transmission confirmation apparatus provided in this embodiment, a detection and receiving module of the confirmation apparatus detects whether a non-Msg3 sent by a terminal is received, and obtains a detection result. A determining module determines, according to the detection result, whether to instruct a first sending module to send first physical downlink control channel signaling to the terminal, so that when uplink data is successfully received, the confirmation apparatus does not need to specially send physical downlink control channel signaling. Instead, the terminal itself confirms whether the uplink data is successfully transmitted, and therefore, overheads of the physical downlink control channel signaling are reduced.

Figure 4:
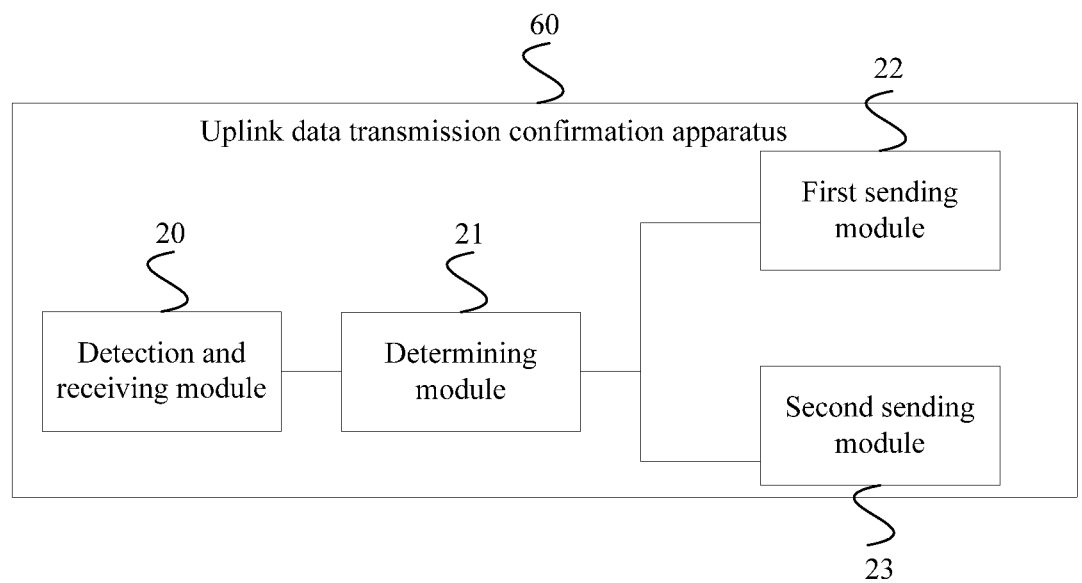
FIG. 4 is a schematic structural diagram of a further embodiment of an uplink data transmission confirmation apparatus.

FIG. 4 is a schematic structural diagram of a further embodiment of an uplink data transmission confirmation apparatus. An implementation of this embodiment relates to a process of confirming, by the terminal together with the confirmation apparatus 60, when the uplink data is an Msg3, whether the uplink data is successfully transmitted. The first physical downlink control channel signaling is used to instruct the terminal to receive an Msg4. In the embodiment shown in FIG. 3, the confirmation apparatus 60 further includes a second sending module 23. The determining module 21 is further configured to instruct the second sending module 23 to send the first physical downlink control channel signaling to the terminal, in response to the detection result being that the detection and receiving module 20 receives, within the second preset period, the uplink data sent by the terminal, so that the terminal determines that the uplink data is successfully transmitted. In some embodiments, the determining module 21 is further configured to instruct the second sending module 23 not to send the first physical downlink control channel signaling to the terminal, in response to the detection result being that the detection and receiving module 20 receives, within the second preset period, no uplink data sent by the terminal, so that the terminal determines that the uplink data is unsuccessfully transmitted.

Specifically, in a random access response process, the confirmation apparatus 60 generally does not need to schedule the terminal by using PDCCH signaling, and instead, performs scheduling by using an RAR message. Therefore, the second physical downlink control channel signaling does not need to be sent to the terminal. The terminal may randomly access the confirmation apparatus 60.

When the uplink data is an Msg3, whether the Msg3 is correctly and successfully transmitted cannot be confirmed in the prior art. However, in this embodiment, when the confirmation apparatus 60 successfully receives the uplink data sent by the terminal, the second sending module 23 directly sends the first physical downlink control channel signaling to the terminal. In this embodiment, the first physical downlink control channel signaling is used to instruct the terminal to receive, on a corresponding resource, the Msg4 sent by the confirmation apparatus 60. That is, the terminal detects, within the first preset period, whether the first physical downlink control channel signaling is received. In response to the first physical downlink control channel signaling being detected, it is determined that the confirmation apparatus 60 successfully receives the uplink data, and in this case, the terminal receives the Msg4 sent by the base station.

When the confirmation apparatus 60 does not successfully receive the uplink data sent by the terminal, the second sending module 23 in the confirmation apparatus 60 does not send the first physical downlink control channel signaling to the terminal. Instead, the terminal detects, within the first preset period, whether the first physical downlink control channel signaling is received. In response to no first physical downlink control channel signaling being detected within the first preset period, it is determined that the confirmation apparatus 60 does not successfully receive the uplink data.

Further, the second preset period is configured by the confirmation apparatus 60 according to a coverage enhancement requirement level of the terminal. In some embodiments, the second preset period is determined by the confirmation apparatus 60 according to a mapping relationship between a coverage enhancement requirement level predefined by the confirmation apparatus 60 and the terminal and the second preset period.

According to the uplink data transmission confirmation apparatus provided in this embodiment, a detection and receiving module of the confirmation apparatus detects whether an Msg3 sent by a terminal is received, and obtains a detection result. A second sending module determines, according to the detection result, whether to send first physical downlink control channel signaling to the terminal, so that the terminal can confirm, by using the first physical downlink control channel signaling, whether the Msg3 is successfully transmitted.

Figure 5:
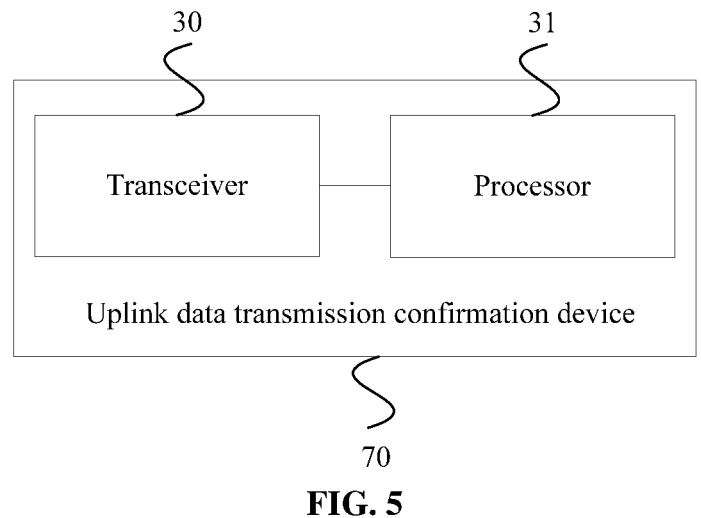
FIG. 5 is a schematic structural diagram of an embodiment of an uplink data transmission confirmation device.

FIG. 5 is a schematic structural diagram of an embodiment of an uplink data transmission confirmation device. The confirmation device 70 may be a terminal or may be integrated in a terminal. The confirmation device 70 includes the following. A transceiver 30, configured to send uplink data to a base station; and a processor 31, configured to detect, within a first preset period, whether first physical downlink control channel signaling sent by the base station is received, and obtain a detection result. The processor 31 is further configured to determine, according to the detection result, whether the uplink data is successfully transmitted.

Specifically, the confirmation device 70 learns, according to scheduling by the base station, uplink resources allocated by the base station to the confirmation device for sending the uplink data. The transceiver 30 sends the uplink data to the base station on these uplink resources, where the uplink data may be a non-Msg3 or may be an Msg3. In addition, when the uplink data sent by the transceiver 30 is a non-Msg3, the base station needs to perform scheduling by using PDCCH signaling. In some embodiments, when the uplink data sent by the transceiver 30 is an Msg3, the base station does not need to perform scheduling by using PDCCH signaling, and instead, performs scheduling by using an RAR message. Then, the confirmation device 70 starts a first timer. The first timer corresponds to the first preset period. Optionally, a length of the first preset period may be configured by the base station. In some embodiments, the length of the first preset period may be determined according to a rule predefined by the confirmation device 70 and the base station. The length of the first preset period is related to a coverage enhancement requirement of the terminal. It should be noted that the coverage enhancement requirement level of the confirmation device 70 may be a coverage enhancement requirement of the terminal or may be a coverage enhancement requirement of a message sent between the terminal and the base station.

The processor 31 detects, within the first preset period, whether first physical downlink control channel signaling sent by the base station within a second preset period is received, and obtains a detection result, where the first physical downlink control channel signaling may be PDCCH signaling or may be ePDCCH signaling, which is not limited in this embodiment. The second preset period may be the following. For a non-Msg3, the base station starts a second timer after scheduling the confirmation device 70 to send the uplink data. For an Msg3, the base station starts a second timer after sending an RAR message to the confirmation device 70. The second timer corresponds to the second preset period. Regardless of whether the uplink data is a non-Msg3 or an Msg3, the second preset period is set in order that as long as the base station sends the first physical downlink control channel signaling, it needs to be ensured that the confirmation device 70 can correctly receive the first physical downlink control channel signaling before the first preset period expires. Optionally, the second preset period may also be configured by the base station, or may be configured by the base station according to a rule predefined by the base station and the confirmation device 70. Optionally, the second preset period is configured by the base station according to a coverage enhancement requirement level of the confirmation device 70. In some embodiments, the second preset period is determined by the base station according to a mapping relationship between a coverage enhancement requirement level predefined by the base station and the confirmation device 70 and the second preset period. Finally, the processor 31 determines, according to the detection result, whether the uplink data is successfully transmitted.

According to the uplink data transmission confirmation device provided in this embodiment, after a transceiver sends uplink data to a base station, a processor detects whether first physical downlink control channel signaling sent by the base station is received, and obtains a detection result. The processor then determines, according to the detection result, whether the uplink data is successfully transmitted. According to this embodiment, the processor determines, within a preset first period, whether the first physical downlink control channel signaling is received. The processor then determines, according to the detection result, whether the uplink data is successfully transmitted, so that when the uplink data is successfully received, the base station does not need to specially send physical downlink control channel signaling to enable the confirmation device to confirm whether the uplink data is successfully transmitted. Therefore, overheads of the physical downlink control channel signaling are reduced, and the confirmation device can confirm, by using the first physical downlink control channel signaling, whether an Msg3 is successfully transmitted.

In the embodiment shown in FIG. 5, the transceiver 30 is further configured to receive second physical downlink control channel signaling sent by the base station, before sending the uplink data. In this embodiment, the second physical downlink control channel signaling is used to instruct the transceiver 30 to send the uplink data.

Specifically, when the transceiver 30 sends the uplink data to the base station, the uplink data generally needs to be sent on an uplink resource allocated by the base station. Therefore, the base station may use the second physical downlink control channel signaling to notify the confirmation device 70 of resources on which the uplink data should be sent, so that the base station can receive, on such resources, the uplink data sent by the transceiver 30.

An implementation of the embodiment shown in FIG. 5 relates to a process of confirming, by the confirmation device 70, when the uplink data is a non-Msg3, whether the uplink data is successfully transmitted. Further, the first physical downlink control channel signaling is used to instruct the transceiver 30 to re-send the uplink data. The processor 31 is configured to determine that the uplink data is successfully transmitted, in response to the detection result being that no first physical downlink control channel signaling sent by the base station is detected within the first preset period. In some embodiments, the processor 31 is configured to determine that the uplink data is unsuccessfully transmitted, in response to the detection result being that the first physical downlink control channel signaling sent by the base station is detected within the first preset period.

Specifically, when the uplink data sent by the transceiver 30 to the base station is successfully transmitted, in the prior art, the base station sends PDCCH signaling to notify the confirmation device 70 that the base station successfully receives the uplink data. However, in this embodiment, the base station does not need to specially send PDCCH signaling to the confirmation device 70. Instead, the processor 31 in the confirmation device 70 detects, within the first preset period, whether the first physical downlink control channel signaling is received. In this embodiment, the first physical downlink control channel signaling is used to instruct the transceiver 30 to re-send the previously sent uplink data. In response to the first physical downlink control channel signaling being detected, the processor 31 determines that the base station does not successfully receive the uplink data, that is, confirms that the uplink data is unsuccessfully transmitted. The transceiver 30 then re-sends the previously sent uplink data to the base station according to the first physical downlink control channel signaling. In response to no first physical downlink control channel signaling being detected, the processor 31 determines that the base station has successfully received the uplink data. Therefore, when the uplink data is successfully received, the base station does not need to specially send PDCCH signaling or ePDCCH signaling to the confirmation device 70 to notify that the base station successfully receives the uplink data. As a result, overheads of the physical downlink control channel signaling are reduced.

According to the uplink data transmission confirmation device provided in this embodiment, after second physical downlink control channel signaling that is used to instruct a transceiver to send uplink data to a base station and that is sent by the base station is received, the transceiver sends uplink data that is a non-Msg3 to the base station. A processor detects whether first physical downlink control channel signaling sent by the base station is received, and obtains a detection result. The processor then determines, according to the detection result, whether the uplink data is successfully transmitted. According to this embodiment, when the uplink data is successfully received, the base station does not need to specially send physical downlink control channel signaling to enable the confirmation device to confirm whether the uplink data is successfully transmitted. Consequently, overheads of the physical downlink control channel signaling are reduced.

Another implementation of the embodiment shown in FIG. 5 relates to a process of confirming, by the confirmation device 70, when the uplink data is an Msg3, whether the uplink data is successfully transmitted. Further, the first physical downlink control channel signaling is used to instruct the transceiver 30 to receive an Msg4 sent by the base station. The processor 31 is further configured to determine that the uplink data is successfully transmitted, in response to the detection result being that the first physical downlink control channel signaling sent by the base station is detected within the first preset period. In some embodiments, the processor 31 is configured to determine that the uplink data is unsuccessfully transmitted, in response to the detection result being that no first physical downlink control channel signaling sent by the base station is detected within the first preset period.

Specifically, in a random access response process, the confirmation device 70 may randomly access the base station. That is, when the transceiver 30 sends the uplink data, the base station does not need to perform scheduling by using PDCCH signaling, and instead, performs scheduling by using an RAR message.

When the uplink data is an Msg3, whether the uplink data is successfully transmitted cannot be confirmed in the prior art. However, in this embodiment, when the uplink data sent by the transceiver 30 is successfully transmitted, the base station sends the first physical downlink control channel signaling to the confirmation device 70. In this embodiment, the first physical downlink control channel signaling is used to instruct the transceiver 30 to receive, on a corresponding resource, the Msg4 sent by the base station. That is, the processor 31 in the confirmation device 70 detects, within the first preset period, whether the first physical downlink control channel signaling is received. In response to the first physical downlink control channel signaling being detected, the processor 31 determines that the base station successfully receives the uplink data. In this case, the transceiver 30 receives, according to the first physical downlink control channel signaling, the Msg4 sent by the base station.

When the uplink data sent by the transceiver 30 is unsuccessfully transmitted, the processor 31 detects, within the first preset period, whether the first physical downlink control channel signaling is received. In response to no first physical downlink control channel signaling being detected within the first preset period, the processor 31 determines that the base station does not successfully receive the uplink data.

Further, the first preset period is configured by the base station according to a coverage enhancement requirement level of the confirmation device 70. In some embodiments, the first preset period is determined by the confirmation device 70 according to a mapping relationship between a coverage enhancement requirement level predefined by the confirmation device 70 and the base station and the first preset period.

According to the uplink data transmission confirmation device provided in this embodiment, a transceiver sends an Msg3 to a base station. A processor detects whether first physical downlink control channel signaling sent by the base station is received, and obtains a detection result. The processor then determines, according to the detection result, whether uplink data is successfully transmitted. This embodiment enables the base station to confirm, by using the first physical downlink control channel signaling and when the uplink data is received successfully or unsuccessfully, whether the uplink data is successfully transmitted.

Figure 6:
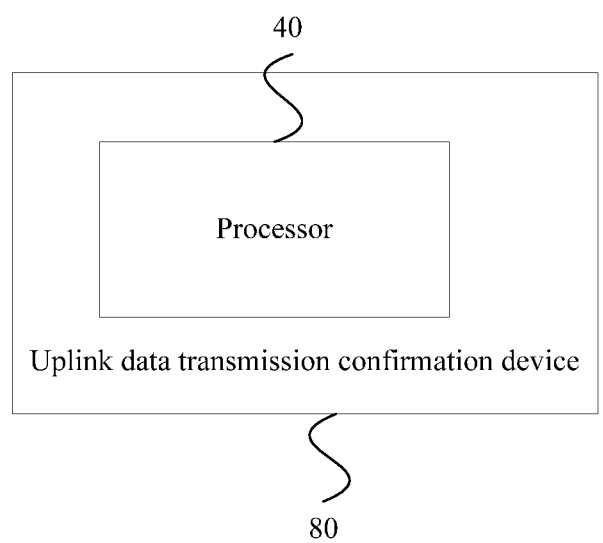
FIG. 6 is a schematic structural diagram of another embodiment of an uplink data transmission confirmation device.

FIG. 6 is a schematic structural diagram of another embodiment of an uplink data transmission confirmation device. The confirmation device 80 may be a base station or may be integrated in a base station. As shown in FIG. 6, the confirmation device 80 includes a processor 40, configured to detect, within a second preset period, whether uplink data sent by a terminal is received, and obtain a detection result. The processor 40 is further configured to determine, according to the detection result, whether to send first physical downlink control channel signaling to the terminal.

Specifically, the terminal sends the uplink data to the confirmation device 80, where the uplink data may be a non-Msg3 or may be an Msg3. In addition, when the uplink data sent by the terminal is a non-Msg3, the confirmation device 80 needs to perform scheduling. When the uplink data sent by the terminal is an Msg3, the confirmation device 80 does not need to perform scheduling by using PDCCH signaling, and instead, performs scheduling by using an RAR message. Moreover, after the terminal sends the uplink data to the confirmation device 80, a first timer is started. The first timer corresponds to a first preset period. Optionally, a length of the first preset period may be configured by the confirmation device 80. In some embodiments, the length of the first preset period may be determined according to a rule predefined by the terminal and the confirmation device 80. The length of the first preset period is related to a coverage enhancement requirement of the terminal. Optionally, the first preset period is configured by the confirmation device 80 according to a coverage enhancement requirement level of the terminal. In some embodiments, the first preset period is determined by the confirmation device 80 according to a mapping relationship between a coverage enhancement requirement level predefined by the confirmation device 80 and the terminal and the first preset period. It should be noted that the coverage enhancement requirement level of the confirmation device 80 may be a coverage enhancement requirement of the terminal or may be a coverage enhancement requirement of a message sent between the terminal and the base station.

When the uplink data sent by the terminal is a non-Msg3, the confirmation device 80 schedules the terminal, that is, notifies the terminal of resources on which the uplink data should be sent to the confirmation device 80, and then starts a second timer in the confirmation device 80. The second timer corresponds to the second preset period. When the uplink data sent by the terminal is an Msg3, the confirmation device 80 starts a second timer after sending an RAR message to the terminal. Similarly, the second timer corresponds to the second preset period.

The processor 40 detects, within the second preset period, whether the uplink data sent by the terminal is received, and obtains the detection result. The processor 40 decides, according to the detection result, whether to send the first physical downlink control channel signaling to the terminal. For example, in response to the confirmation device 80 successfully receiving the non-Msg3, the confirmation device 80 does not specially send physical downlink control channel signaling to the terminal to notify the terminal that the confirmation device 80 successfully receives the uplink data. Instead, the terminal itself determines whether the corresponding physical downlink control channel signaling is received within the first preset period, so as to determine whether the uplink data is successfully transmitted. In response to the confirmation device 80 not successfully receiving the Msg3, the terminal itself determines whether the corresponding physical downlink control channel signaling is received within the first preset period, so as to determine whether the uplink data is successfully transmitted. Therefore, the confirmation device 80 reduces the corresponding physical downlink control channel signaling, and can confirm whether the Msg3 message is successfully transmitted.

It should be noted that regardless of whether the uplink data is a non-Msg3 or an Msg3, the second preset period is set in order that as long as the base station sends the first physical downlink control channel signaling, it needs to be ensured that the terminal can correctly receive the first physical downlink control channel signaling before the first preset period expires. Optionally, the second preset period may be configured by the confirmation device 80, or may be configured by the confirmation device 80 according to a rule predefined by the confirmation device 80 and the terminal. It should be noted that the coverage enhancement requirement level of the confirmation device 80 may be a coverage enhancement requirement of the terminal or may be a coverage enhancement requirement of a message sent between the terminal and the base station.

According to the uplink data transmission confirmation device provided in this embodiment, a processor of the confirmation device detects whether uplink data sent by a terminal is received, and obtains a detection result. The processor of the confirmation device then determines, according to the detection result, whether to send first physical downlink control channel signaling to the terminal, so that when the uplink data is successfully received, the confirmation device does not need to specially send physical downlink control channel signaling to enable the terminal to confirm whether the uplink data is successfully transmitted. Therefore, overheads of the physical downlink control channel signaling are reduced, and the terminal can confirm, by using the first physical downlink control channel signaling, whether an Msg3 is successfully transmitted.

Figure 7:
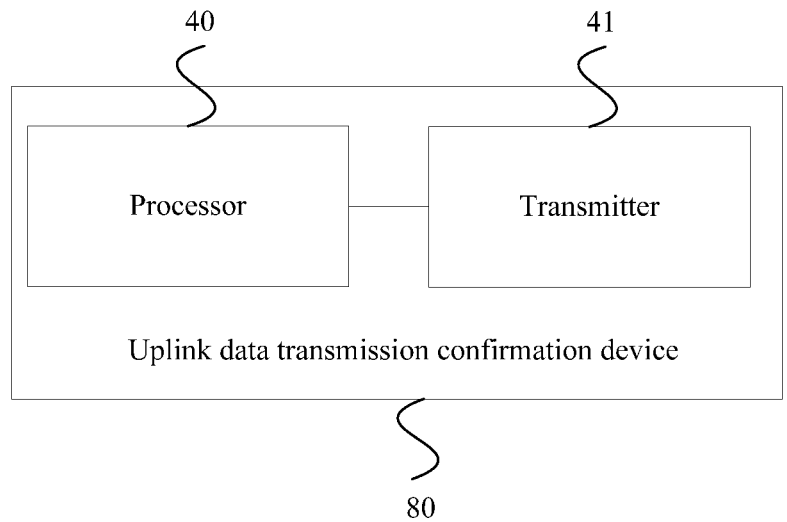
FIG. 7 is a schematic structural diagram of yet another embodiment of an uplink data transmission confirmation device.

FIG. 7 is a schematic structural diagram of yet another embodiment of an uplink data transmission confirmation device. In the embodiment shown in FIG. 7, the confirmation device 80 further includes a transmitter 41, configured to send second physical downlink control channel signaling to the terminal, before the processor 40 detects, within the second preset period, whether the uplink data sent by the terminal is received. In this embodiment, the second physical downlink control channel signaling is used to instruct the terminal to send the uplink data.

Specifically, when the terminal sends the uplink data, the uplink data needs to be sent on a corresponding resource. Therefore, the confirmation device 80 needs to allocate corresponding resources to the terminal and notify the terminal to send the uplink data on such resources. That is, the transmitter 41 in the confirmation device 80 further sends the second physical downlink control channel signaling to the terminal, where the second physical downlink control channel signaling is used to instruct the terminal to send the uplink data.

An implementation of the embodiment shown in FIG. 7 relates to a process of confirming, by the terminal together with the confirmation device 80, when the uplink data is a non-Msg3, whether the uplink data is successfully transmitted. Further, the first physical downlink control channel signaling is used to instruct the terminal to re-send the uplink data. The processor 40 is configured to instruct the transmitter 41 not to send the first physical downlink control channel signaling to the terminal, in response to the detection result being that the uplink data sent by the terminal is received within the second preset period, so that the terminal determines that the uplink data is successfully transmitted. In some embodiments, the processor 40 is configured to instruct the transmitter 41 to send the first physical downlink control channel signaling to the terminal, in response to the detection result being that no uplink data sent by the terminal is received within the second preset period, so that the terminal determines that the uplink data is unsuccessfully transmitted.

Specifically, when the confirmation device 80 does not successfully receive the uplink data sent by the terminal, the first physical downlink control channel signaling that is used to instruct the terminal to re-send the uplink data is sent to the terminal in this embodiment. However, when the confirmation device 80 successfully receives the uplink data sent by the terminal, in the prior art, the confirmation device 80 sends PDCCH signaling to notify the terminal that the confirmation device 80 successfully receives the uplink data, and in a coverage enhancement scenario, further repeatedly sends the PDCCH signaling. However, in this embodiment, the confirmation device 80 does not need to specially send PDCCH signaling to the terminal. Instead, the terminal detects, within the first preset period, whether the first physical downlink control channel signaling is received. In this embodiment, the first physical downlink control channel signaling is used to instruct the terminal to re-send the previously sent uplink data. In response to the terminal detecting, within the first preset period, the first physical downlink control channel signaling sent by the transmitter 41, the terminal determines that the confirmation device 80 does not successfully receive the uplink data, that is, confirms that the uplink data is unsuccessfully transmitted. The terminal re-sends the previously sent uplink data to the confirmation device 80 according to the first physical downlink control channel signaling. In response to the terminal detecting no first physical downlink control channel signaling, the terminal determines that the confirmation device 80 has successfully received the uplink data, and in this case, the confirmation device 80 does not need to specially send PDCCH signaling or ePDCCH signaling to the terminal to notify that the base station successfully receives the uplink data. As a result, overheads of the physical downlink control channel signaling are reduced.

According to the uplink data transmission confirmation device provided in this embodiment, a processor of the confirmation device detects whether a non-Msg3 sent by a terminal is received, and obtains a detection result. The processor then determines, according to the detection result, whether to instruct a transmitter to send first physical downlink control channel signaling to the terminal, so that when uplink data is successfully received, the confirmation device does not need to specially send physical downlink control channel signaling. Instead, the terminal itself confirms whether the uplink data is successfully transmitted, and therefore, an overheads of the physical downlink control channel signaling are reduced.

Another implementation of the embodiment shown in FIG. 7 relates to a process of confirming, by the terminal together with the confirmation device 80, when the uplink data is an Msg3, whether the uplink data is successfully transmitted. A transmitter in this embodiment may be shared as the transmitter 41 in the embodiment in FIG. 7. However, it should be noted that when the uplink data is an Msg3, the transmitter 41 does not need to send the second physical downlink control channel signaling to the terminal (because the Msg3 is scheduled by using an RAR message). Further, the first physical downlink control channel signaling is used to instruct the terminal to receive an Msg4 sent by the base station. The processor 40 is further configured to instruct the transmitter 41 to send the first physical downlink control channel signaling to the terminal, in response to the detection result being that the uplink data sent by the terminal is received within the second preset period, so that the terminal determines that the uplink data is successfully transmitted. In some embodiments, the processor 40 is configured to instruct the transmitter 41 not to send the first physical downlink control channel signaling to the terminal, in response to the detection result being that no uplink data sent by the terminal is received within the second preset period, so that the terminal determines that the uplink data is unsuccessfully transmitted.

Specifically, in a random access response process, the confirmation device 80 generally does not need to perform scheduling by using PDCCH signaling, and instead, performs scheduling by using an RAR message. Therefore, the terminal may randomly access the confirmation device 80.

In this embodiment, when the confirmation device 80 successfully receives the uplink data sent by the terminal, the transmitter 41 sends the first physical downlink control channel signaling to the terminal. In this embodiment, the first physical downlink control channel signaling is used to instruct the terminal to receive, on a corresponding resource, the Msg4 sent by the confirmation device 80. That is, the terminal detects, within the first preset period, whether the first physical downlink control channel signaling is received. In response to the first physical downlink control channel signaling being detected, it is determined that the confirmation device 80 successfully receives the uplink data, and in this case, the terminal receives the Msg4 sent by the base station.

When the confirmation device 80 does not successfully receive the uplink data sent by the terminal, the confirmation device 80 does not send the first physical downlink control channel signaling to the terminal. Instead, the terminal detects, within the first preset period, whether the first physical downlink control channel signaling is received. In response to no first physical downlink control channel signaling being detected within the first preset period, it is determined that the confirmation device 80 does not successfully receive the uplink data.

Further, the second preset period is configured by the confirmation device 80 according to a coverage enhancement requirement level of the terminal. In some embodiments, the second preset period is determined by the confirmation device 80 according to a mapping relationship between a coverage enhancement requirement level predefined by the confirmation device 80 and the terminal and the second preset period.

According to the uplink data transmission confirmation device provided in this embodiment, a processor of the confirmation device detects whether an Msg3 sent by a terminal is received, and obtains a detection result. A transmitter determines, according to the detection result, whether to send first physical downlink control channel signaling to the terminal, so that the terminal can confirm, by using the first physical downlink control channel signaling, whether the Msg3 is successfully transmitted.

Figure 8:
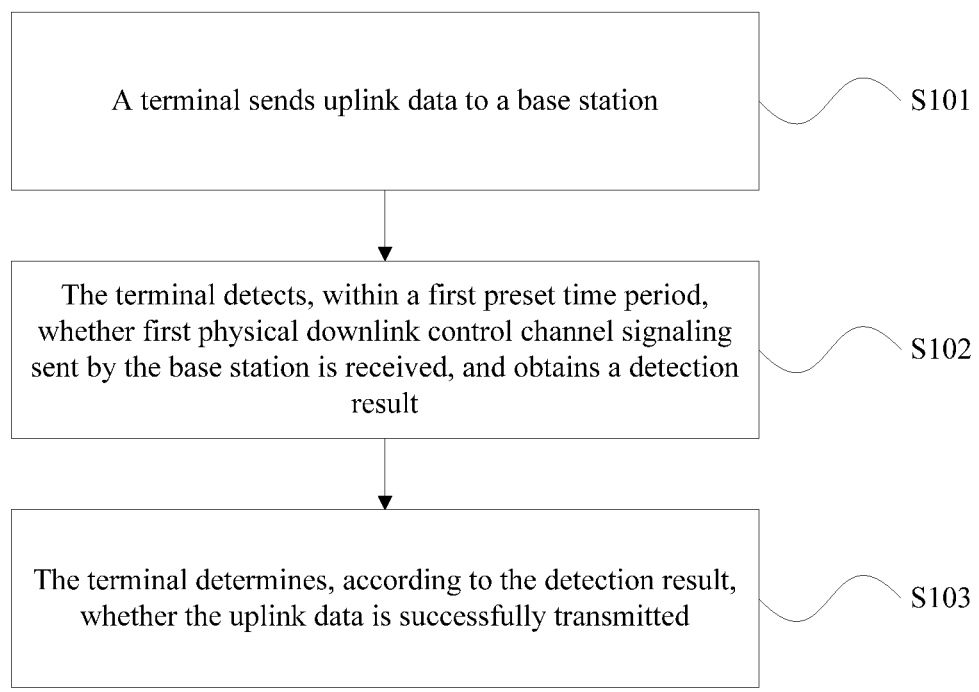
FIG. 8 is a flowchart of an embodiment of an uplink data transmission confirmation method.

FIG. 8 is a flowchart of an of an uplink data transmission confirmation method. As shown in FIG. 8, the method includes the following.

Step S101, where a terminal sends uplink data to a base station.

Step S102, where the terminal detects, within a first preset period, whether first physical downlink control channel signaling sent by the base station is received, and obtains a detection result.

Step S103, where the terminal determines, according to the detection result, whether the uplink data is successfully transmitted.

For the uplink data transmission confirmation method provided in this embodiment, reference may be made to an execution process of the uplink data transmission confirmation apparatus or the uplink data transmission confirmation device described above. Implementation principles and technical effects thereof are similar, and are not described herein again.

Further, in the embodiment shown in FIG. 8, before step S101, the method further includes receiving, by the terminal, second physical downlink control channel signaling sent by the base station. In such an embodiment, the second physical downlink control channel signaling is used to instruct the terminal to send the uplink data.

An implementation of the embodiment shown in FIG. 8 relates to a specific process of confirming, by the terminal when the uplink data is a non-Msg3, whether the uplink data is successfully transmitted. Specifically, the first physical downlink control channel signaling is used to instruct the terminal to re-send the uplink data. In response to the terminal detecting, within the first preset period, no first physical downlink control channel signaling sent by the base station, then the terminal determines that the uplink data is successfully transmitted. In some embodiments, in response to the terminal detecting, within the first preset period, the first physical downlink control channel signaling sent by the base station, then the terminal determines that the uplink data is unsuccessfully transmitted.

For the uplink data transmission confirmation method provided in FIG. 8, reference may be made to an execution process of the uplink data transmission confirmation apparatus or the uplink data transmission confirmation device described above. Implementation principles and technical effects thereof are similar, and are not described herein again.

Another implementation of the embodiment shown in FIG. 8 relates to a process of confirming, by the terminal, when the uplink data is an Msg3, whether the uplink data is successfully transmitted. Specifically, the first physical downlink control channel signaling is used to instruct the terminal to receive an Msg4 sent by the base station. In response to the terminal detecting, within the first preset period, the first physical downlink control channel signaling sent by the base station, then the terminal determines that the uplink data is successfully transmitted. In some embodiments, in response to the terminal detecting, within the first preset period, no first physical downlink control channel signaling sent by the base station, then the terminal determines that the uplink data is unsuccessfully transmitted.

Further, the first preset period is configured by the base station. In some embodiments, the first preset period is determined by the terminal according to a rule predefined by the terminal and the base station. Still further, the first preset period is configured by the base station according to a coverage enhancement requirement level of the terminal. In some embodiments, the first preset period is determined by the terminal according to a mapping relationship between a coverage enhancement requirement level predefined by the terminal and the base station and the first preset period.

For the uplink data transmission confirmation method provided in this embodiment, reference may be made to an execution process of the uplink data transmission confirmation apparatus or the uplink data transmission confirmation device described above. Implementation principles and technical effects thereof are similar, and are not described herein again.

Figure 9:
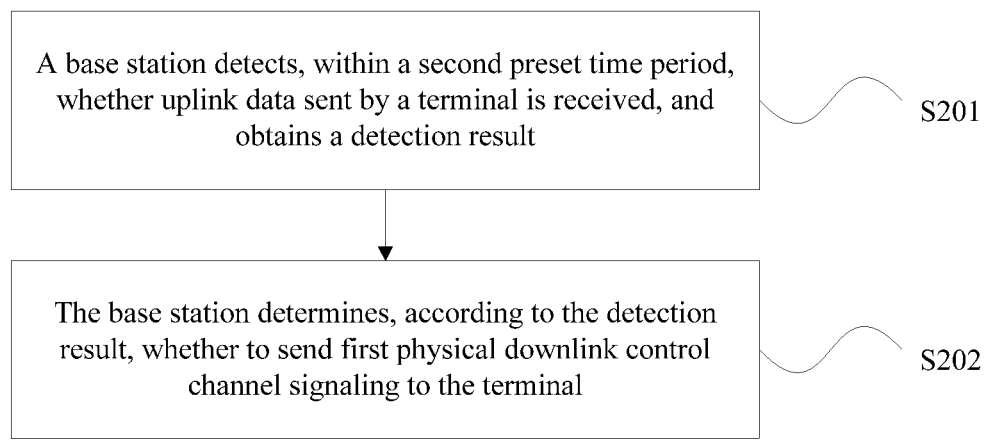
FIG. 9 is a flowchart of another embodiment of an uplink data transmission confirmation method.

FIG. 9 is a schematic flowchart of another embodiment of an uplink data transmission confirmation method. As shown in FIG. 9, the method includes the following.

Step S201, where a base station detects, within a second preset period, whether uplink data sent by a terminal is received, and obtains a detection result.

Step S202, where the base station determines, according to the detection result, whether to send first physical downlink control channel signaling to the terminal.

For the uplink data transmission confirmation method shown in FIG. 9, reference may be made to an execution process of the uplink data transmission confirmation apparatus or the uplink data transmission confirmation device described above. Implementation principles and technical effects thereof are similar, and are not described herein again.

In the embodiment shown in FIG. 9, before S201, the method further includes sending, by the base station, second physical downlink control channel signaling to the terminal. In such an embodiment, the second physical downlink control channel signaling is used to instruct the terminal to send the uplink data.

An implementation of the embodiment shown in FIG. 9 relates to a specific process of confirming, by the terminal together with the base station, when the uplink data is a non-Msg3, whether the uplink data is successfully transmitted. Specifically, the first physical downlink control channel signaling is used to instruct the terminal to re-send the uplink data. In response to the base station receiving, within the second preset period, the uplink data sent by the terminal, then the base station sends no first physical downlink control channel signaling to the terminal, so that the terminal determines that the uplink data is successfully transmitted.

In some embodiments, in response to the base station receiving, within the second preset period, no uplink data sent by the terminal, then the base station sends the first physical downlink control channel signaling to the terminal, so that the terminal determines that the uplink data is unsuccessfully transmitted.

For the uplink data transmission confirmation method provided in this embodiment, reference may be made to an execution process of the uplink data transmission confirmation apparatus or the uplink data transmission confirmation device described above. Implementation principles and technical effects thereof are similar, and are not described herein again.

Another implementation of the embodiment shown in FIG. 9 relates to a specific process of confirming, by the terminal together with the base station, when the uplink data is an Msg3, whether the uplink data is successfully transmitted. Specifically, the first physical downlink control channel signaling is used to instruct the terminal to receive an Msg4 sent by the base station. In response to the base station receiving, within the second preset period, the uplink data sent by the terminal, then the base station sends the first physical downlink control channel signaling to the terminal, so that the terminal determines that the uplink data is successfully transmitted. In some embodiments, in response to the base station receiving, within the second preset period, no uplink data sent by the terminal, then the base station sends no first physical downlink control channel signaling to the terminal, so that the terminal determines that the uplink data is unsuccessfully transmitted.

Further, the second preset period is configured by the base station. In some embodiments, the second preset period is configured by the base station according to a rule predefined by the base station and the terminal. Still further, the second preset period is configured by the base station according to a coverage enhancement requirement level of the terminal. In some embodiments, the second preset period is determined by the base station according to a mapping relationship between a coverage enhancement requirement level predefined by the base station and the terminal and the second preset period.

For the uplink data transmission confirmation method provided in this embodiment, reference may be made to an execution process of the uplink data transmission confirmation apparatus or the uplink data transmission confirmation device described above. Implementation principles and technical effects thereof are similar, and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present disclosure.

What is claimed is:

1. A method, comprising:
sending, by a terminal device to a base station, first uplink data through a non-message 3 (non-Msg3);
detecting, by the terminal device after sending the first uplink data, whether first physical downlink control channel (PDCCH) signaling sent by the base station is received within a first preset period started from when the first uplink data is sent, wherein the first preset period is determined according to a mapping relationship between a coverage enhancement requirement level of the terminal device and the first preset period, and the first PDCCH signaling is dedicated to notify the terminal device that the base station unsuccessfully receives the first uplink data;
determining, by the terminal device, that the first uplink data is successfully transmitted to the base station upon detecting that the first PDCCH signaling is not received within the first preset period;
determining, by the terminal device, that the first uplink data is unsuccessfully transmitted to the base station upon detecting that the first PDCCH signaling is received within the first preset period, wherein the first PDCCH signaling instructs re-sending the first uplink data;
sending, by the terminal device to the base station, second uplink data through a message 3 (Msg3);
detecting, by the terminal device after sending the second uplink data, whether second PDCCH signaling sent by the base station is received within a second preset period started from when the second uplink data is sent, wherein the second preset period is determined according to a mapping relationship between a coverage enhancement requirement level of the terminal device and the second preset period, and the second PDCCH signaling instructs the terminal device to receive a random access contention resolution message (Msg4) sent by the base station;
determining, by the terminal device, that the second uplink data is unsuccessfully transmitted to the base station upon detecting that the second PDCCH signaling is not received within the second preset period; and
upon detecting that the second PDCCH signaling is received within the second preset period, determining, by the terminal device, that the second uplink data is successfully transmitted to the base station, and receiving, by the terminal device, the Msg4 according to the second PDCCH signaling; and
wherein the first preset period and the second preset period correspond to a same first timer, and a length of the first preset period and a length of the second preset period are same.

2. The method according to claim 1, further comprising:
receiving, by the terminal device, third PDCCH signaling, wherein the third PDCCH signaling instructs the terminal device to send the first uplink data; and
receiving, by the terminal device, a random access response (RAR) message, wherein the RAR message schedules the terminal device to send the second uplink data.

3. A method, comprising:
detecting, by a base station, whether first uplink data of a terminal device is received within a third preset period, and based thereon, determining, by the base station, whether to send first physical downlink control channel (PDCCH) signaling to indicate a status of receiving the first uplink data by the base station, the first uplink data being carried in a non-message 3 (non-Msg3), wherein the third preset period is determined according to a mapping relationship between a coverage enhancement requirement level of the terminal device and the third preset period, and the first PDCCH signaling is dedicated to notify the terminal device that the base station unsuccessfully receives the first uplink data;

determining, by the base station, to not send the first PDCCH signaling upon detecting that the first uplink data is received within the third preset period;

determining, by the base station, to send the first PDCCH signaling upon detecting that the first uplink data is not received within the third preset period, wherein the first PDCCH signaling instructs the terminal device to re-send the first uplink data;

detecting, by the base station, whether second uplink data of the terminal device is received within a fourth preset period, and based thereon, determining, by the base station, whether to send second PDCCH signaling to indicate a status of receiving the second uplink data by the base station, the second uplink data being carried in a message 3 (Msg3), wherein the fourth preset period is determined according to a mapping relationship between a coverage enhancement requirement level of the terminal device and the fourth preset period, and the second PDCCH instructs the terminal device to receive a random access contention resolution message (Msg4) sent by the base station;

determining, by the base station, to not send the second PDCCH signaling upon detecting that the second uplink data is not received within the fourth preset period; and upon detecting that the second uplink data is received within the fourth preset period, sending, by the base station, the second PDCCH signaling, and send the Msg4; and wherein the third preset period and the fourth preset period correspond to a same second timer, and a length of the third preset period and a length of the fourth preset period are same.

4. The method according to claim 3, further comprising:
sending, by the base station, third PDCCH signaling, wherein the third PDCCH signaling instructs the terminal device to send the first uplink data, the third preset period starts from after scheduling the terminal device to send the first uplink data; and
sending, by the base station, a random access response (RAR) message, wherein the RAR message schedules the terminal device to send the second uplink data, the fourth preset period starts from after sending the RAR message to the terminal device.

5. A terminal device, comprising:
a processor; and
a memory storing a program, wherein the program, when executed by the processor, causes the terminal device to:
send first uplink data through a non-message 3 (non-Msg3) to a base station;
after sending the first uplink data, detect whether first physical downlink control channel (PDCCH) signaling sent by the base station is received within a first preset period started from when the first uplink data is sent, wherein the first preset period is determined according to a mapping relationship between a coverage enhancement requirement level of the terminal device and the first preset period, and the first PDCCH signaling is dedicated to notify the terminal device that the base station unsuccessfully receives the first uplink data;

determine that the first uplink data is successfully transmitted to the base station upon detecting that the first PDCCH signaling is not received within the first preset period;

determine that the first uplink data is unsuccessfully transmitted to the base station upon detecting that the first PDCCH signaling is received within the first preset period, wherein the first PDCCH signaling instructs re-sending the first uplink data;

send second uplink data through a message 3 (Msg3) to the base station;

after sending the second uplink data, detect whether second PDCCH signaling sent by the base station within a second preset period is received started from when the second uplink data is sent, wherein the second preset period is determined according to a mapping relationship between a coverage enhancement requirement level of the terminal device and the second preset period, and the second PDCCH signaling instructs the terminal device to receive a random access contention resolution message (Msg4) sent by the base station;

determine that the second uplink data is unsuccessfully transmitted to the base station upon detecting that the second PDCCH signaling is not received within the second preset period; and upon detecting that the second PDCCH signaling is received within the second preset period, determine that the second uplink data is successfully transmitted to the base station, and receive the Msg4 according to the second PDCCH signaling; and wherein the first preset period and the second preset period correspond to a same first timer, and a length of the first preset period and a length of the second preset period are same.

6. The terminal device according to claim 5, wherein the program further causes the terminal device to:
receive third PDCCH signaling, wherein the third PDCCH signaling instructs the terminal device to send the first uplink data; and
receive a random access response (RAR) message, wherein the RAR message schedules the terminal device to send the second uplink data.

7. A network device, comprising:
a processor;
a memory storing a program to be executed in the processor, the program, when executed, causes the network device to:
detect whether first uplink data of a terminal device is received within a third preset period, and based thereon, determine whether to send first physical downlink control channel (PDCCH) signaling to indicate a status of receiving the first uplink data by the network device, the first uplink data being carried in a non-message 3 (non-Msg3), wherein the third preset period is determined according to a mapping relationship between a coverage enhancement requirement level of the terminal device and the third preset period, and the first PDCCH signaling is dedicated to notify the terminal device that the base station unsuccessfully receives the first uplink data;

determine to not send the first PDCCH signaling upon detecting that the first uplink data is received within the third preset period;

determine to send the first PDCCH signaling upon detecting that the first uplink data is not received within the third preset period, wherein the first PDCCH signaling instructs the terminal device to re-send the first uplink data;

detect whether second uplink data of the terminal device is received within a fourth preset period, and based thereon, determine whether to send second PDCCH signaling to indicate a status of receiving the second uplink data by the network device, the second uplink data being carried in a message 3 (Msg3), wherein the fourth preset period is determined according to a mapping relationship between a coverage enhancement requirement level of the terminal device and the fourth preset period, and the second PDCCH instructs the terminal device to receive a random access contention resolution message (Msg4) sent by the network device;

determine to not send the second PDCCH signaling upon detecting that the second uplink data is not received within the fourth preset period; and upon detecting that the second uplink data is received within the fourth preset period, sending, by the network device, the second PDCCH signaling, and send the Msg4; and wherein the third preset period and the fourth preset period correspond to a same second timer, and a length of the third preset period and a length of the fourth preset period are same.

8. The network device according to claim 7, wherein the program further causes the network device to send third PDCCH signaling, wherein the third PDCCH signaling instructs the terminal device to send the first uplink data, the third preset period starts from after scheduling the terminal device to send the first uplink data; and send a random access response (RAR) message, wherein the RAR message schedules the terminal device to send the second uplink data, the fourth preset period starts from after sending the RAR message to the terminal device.

* * * * *